(12) United States Patent
Asakura et al.

(10) Patent No.: US 11,549,233 B2
(45) Date of Patent: Jan. 10, 2023

(54) SCRAPER VEHICLE

(71) Applicant: JDC Corporation, Tokyo (JP)

(72) Inventors: Takeo Asakura, Tokyo (JP); Hidetoshi Morimoto, Tokyo (JP); Masakazu Sekiguchi, Tokyo (JP)

(73) Assignee: JDC Corporation, Tokyo (JP)

( * ) Notice: Subject to any disclaimer, the term of this patent is extended or adjusted under 35 U.S.C. 154(b) by 0 days.

(21) Appl. No.: 17/609,637

(22) PCT Filed: May 21, 2020

(86) PCT No.: PCT/JP2020/020095
§ 371 (c)(1),
(2) Date: Nov. 8, 2021

(87) PCT Pub. No.: WO2021/014729
PCT Pub. Date: Jan. 28, 2021

(65) Prior Publication Data
US 2022/0145581 A1     May 12, 2022

(30) Foreign Application Priority Data

Jul. 25, 2019   (JP) .............................. JP2019-136991

(51) Int. Cl.
*E02F 3/65*   (2006.01)
*G01G 19/12*  (2006.01)

(52) U.S. Cl.
CPC ............... *E02F 3/65* (2013.01); *G01G 19/12* (2013.01)

(58) Field of Classification Search
CPC .. B60D 1/06; B60D 1/248; B60D 1/62; E02F 3/651; E02F 3/6481; E02F 3/6409;
(Continued)

(56) References Cited

U.S. PATENT DOCUMENTS

| 5,442,146 A * | 8/1995 | Bell ...................... G01P 15/097 310/321 |
| 5,682,958 A * | 11/1997 | Kalhorn ................. B60K 17/10 180/242 |

(Continued)

FOREIGN PATENT DOCUMENTS

| DE | 102014013812 A1 * | 3/2016 | ............... B60D 1/06 |
| JP | S60-027170 U | 2/1985 | |

(Continued)

OTHER PUBLICATIONS

Decision to Grant a Patent in related JP Application No. 2020-545397, dated Dec. 1, 2020, and its English translation, 7 pgs.

(Continued)

*Primary Examiner* — Nimeshkumar D Patel
*Assistant Examiner* — Gedeon M Kidanu
(74) *Attorney, Agent, or Firm* — Young Basile Hanlon & MacFarlane, P.C.

(57) ABSTRACT

To measure the weight of an excavated object, with a simple configuration at low cost, a scraper vehicle includes a coupler having a first portion to be coupled to a driving vehicle and a first detection device provided at at least one of the first portion of the coupler and a first supporting member that supports the first portion. The first detection device is configured to detect a variation in a physical quantity of the first portion.

20 Claims, 5 Drawing Sheets

(58) Field of Classification Search
CPC ......... E02F 3/652; E02F 3/655; E02F 9/2062;
E02F 9/2075; E02F 9/2091; E02F 9/2095;
E02F 9/2217; E02F 9/2253; E02F 9/264;
B60K 17/356; B60K 17/10; B60K 23/08;
B60K 23/0808; B60G 17/019; B60G
2204/11; B60G 2204/416; B60G 2400/60;
B60G 2400/61; B60G 2400/64; B60G
2401/12; B60G 7/005; B60L 1/006; F16C
11/0604; F16C 11/0619; F16C 17/24;
F16C 2326/05; F16H 61/4148; G01G
19/08; G01G 19/083; G01G 19/10; Y10T
403/32737; G01L 1/127; G01L 1/14
See application file for complete search history.

(56) References Cited

U.S. PATENT DOCUMENTS

| 10,406,872 | B2* | 9/2019 | Scheips | G01L 1/14 |
| 2007/0261502 | A1* | 11/2007 | Steinkamp | F16C 11/0604 403/135 |
| 2010/0018727 | A1* | 1/2010 | Carlton | E02F 3/655 172/3 |
| 2012/0031736 | A1* | 2/2012 | Swinderman | B65G 43/02 198/502.1 |
| 2014/0237868 | A1* | 8/2014 | Whitchurch | G01G 19/083 37/413 |
| 2016/0231165 | A1* | 8/2016 | Fredrickson | G01G 19/08 |
| 2017/0306589 | A1* | 10/2017 | Ge | E02F 9/2095 |

FOREIGN PATENT DOCUMENTS

| JP | H02-080720 A | 3/1990 |
| WO | 2020/261788 A1 | 12/2020 |

OTHER PUBLICATIONS

Notice of Reasons for Refusal in related JP Application No. 2020-545397, dated Oct. 6, 2020, and its English translation, 10 pgs.

International Search Report in PCT/JP2020/020095, dated Aug. 4, 2020, and its English translation, 4 pgs.

* cited by examiner

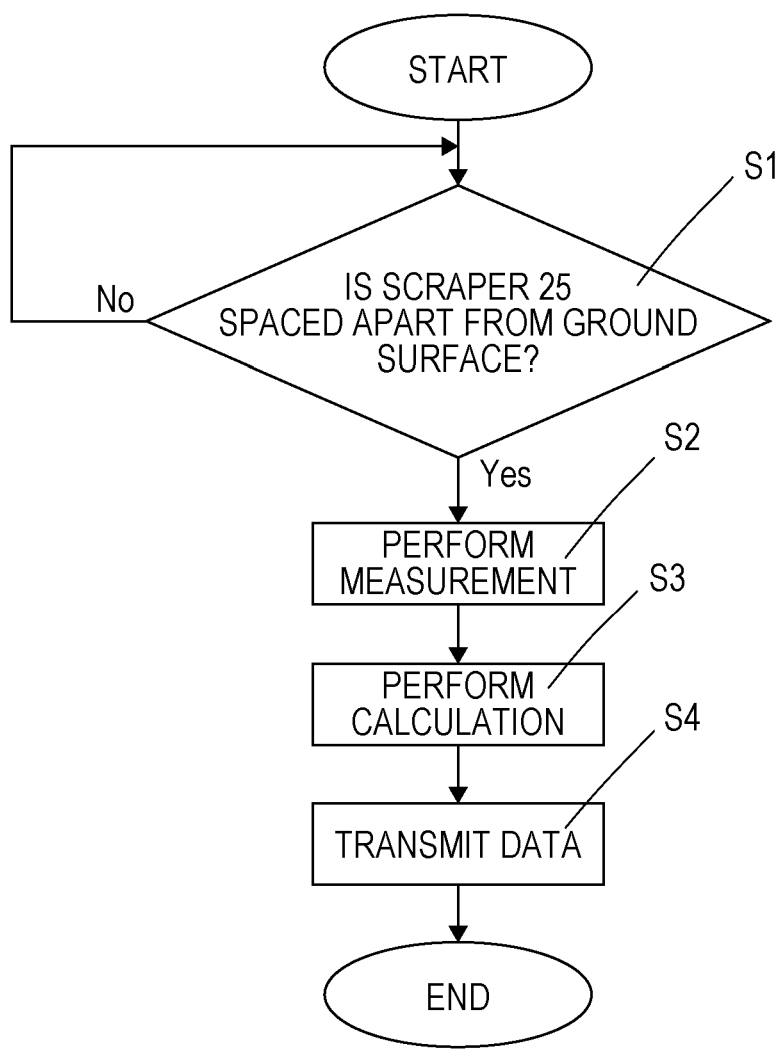

SCRAPER VEHICLE

TECHNICAL FIELD

The present invention relates to a scraper vehicle including a scraper capable of excavation.

BACKGROUND

A known scraper vehicle including a scraper for excavating, for example, the ground surface has been used in a construction site. Such a scraper vehicle is provided with a bowl for storing an excavated object excavated by the scraper. JP Patent Publication No. H02-80720 A describes measuring the weight of the excavated object house in the bowl.

BRIEF SUMMARY

In the weight measurement described in JP Patent Publication No. H02-80720 A, the load weight in the bowl is measured by a pressure sensor that detects the hydraulic pressure of a bowl cylinder that moves the bowl upward and downward. Thus, such a known scraper as above has difficulty in achieving measurement of the load weight with a simple configuration at low cost.

Therefore, an object of the present invention is to provide a scraper vehicle enabling measurement of the weight of an excavated object, with a simple configuration at low cost.

A scraper vehicle according to the present invention is a scraper vehicle configured to move with a driving vehicle. The scraper vehicle can include a coupler having a first portion to be coupled to the driving vehicle and a first detection device provided at at least one of the first portion of the coupler and a first supporting member that supports the first portion. The first detection device is configured to detect a variation in a physical quantity of the first portion.

According to the present invention, because the first detection device that detects the change in the physical quantity of the first portion is provided at at least one of the first portion of the coupler and the first supporting member that supports the first portion, the weight of an excavated object can be measured with a simple configuration at low cost.

BRIEF DESCRIPTION OF THE DRAWINGS

FIG. 4 is a flowchart executed by a control device of the first embodiment.

DETAILED DESCRIPTION

Hereinafter, a first embodiment of the present invention will be described in detail with reference to the accompanying drawings. Note that the embodiments described below are not limiting to the present invention.

First Embodiment

A scraper vehicle 20 according to the first embodiment is used as a towed vehicle towed by a large truck or another towing vehicle 1.

Figure 1:
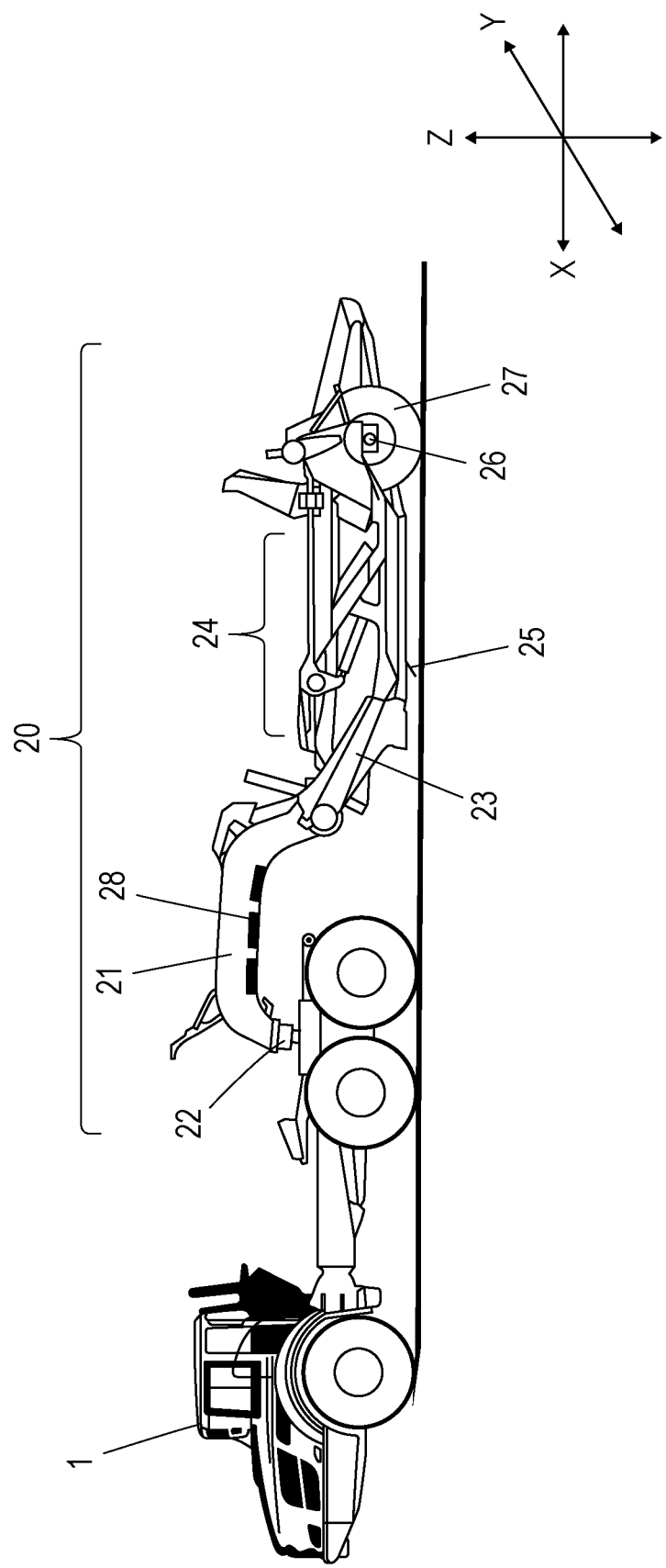
FIG. 1 is a schematic view of a towing vehicle and a scraper vehicle of a first embodiment.

FIG. 1 is a schematic view of the towing vehicle 1 serving as a driving vehicle and a scraper vehicle 20 according to the first embodiment. As illustrated in FIG. 1, the towing vehicle 1 tows the scraper vehicle 20, and is coupled to the scraper vehicle 20 by a hitch 21 serving as a coupler. The hitch 21 is detachable from the towing vehicle 1, and includes a flexible ball joint 22 provided at one end on the towing vehicle 1 side and a flexible ball joint (unillustrated) provided at the other end on the scraper vehicle 20 side.

Scraper Vehicle

Figure 2:
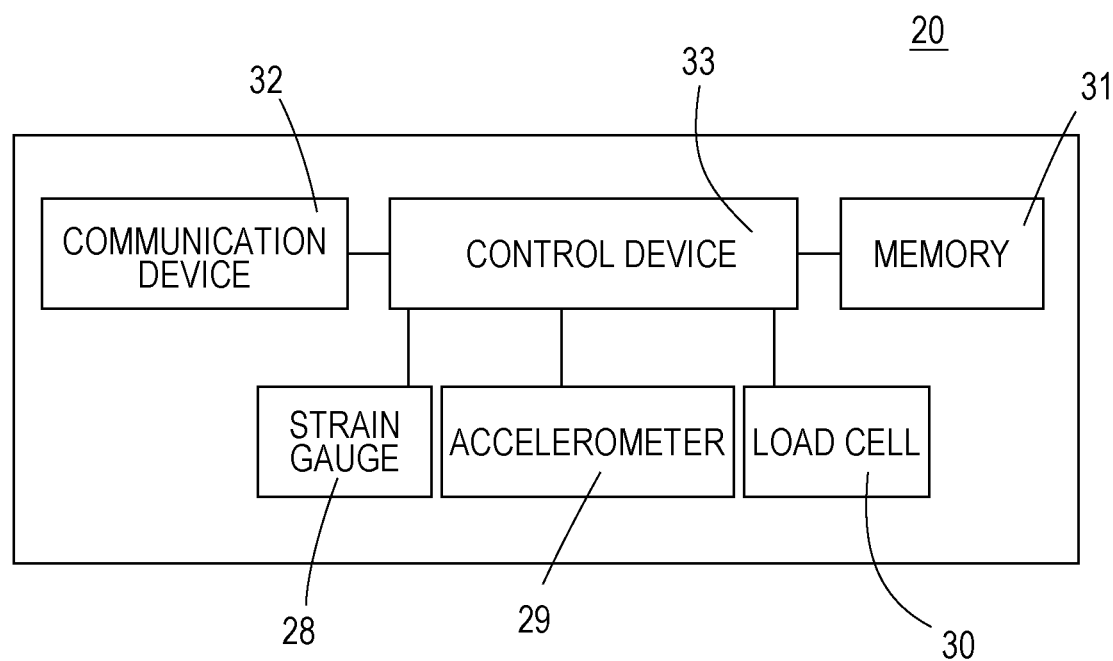
FIG. 2 is a block diagram of a main part in the scraper vehicle of the first embodiment.

FIG. 2 is a block diagram of a main part in the scraper vehicle 20 of the first embodiment, and the configuration of the scraper vehicle 20 will be described below with reference to FIGS. 1 and 2.

In addition to the hitch 21 and the ball joint 22 described above, the scraper vehicle 20 includes a frame 23, a bowl 24, a scraper 25, an axle 26, a wheel 27, a strain gauge 28, an accelerometer 29, a load cell 30, a memory 31 storing various types of data, a communication device 32, and a control device 33 that controls the entirety of the scraper vehicle 20.

The frame 23 is a metallic frame supporting a structure such as the bowl 24. The bowl 24 has an open upper face and houses an excavated object such as earth and sand excavated by the scraper 25.

The scraper 25 is a blade-shaped or spatula-shaped member for scraping earth and sand on a traveling face such as the surface of the earth, and is provided integrally with the bowl 24 at the bottom of the bowl 24 in the present embodiment.

The bowl 24 and the scraper 25 are integrally provided. Thus, an unillustrated hydraulic cylinder inclines the bowl 24 toward the ground surface so that the scraper 25 can dig into the ground surface and excavate earth and sand. Further, an unillustrated opening is provided in the front of the bowl 24 (on the left side of the bowl 24 illustrated in FIG. 1). With the bowl 24 at an angle to the ground surface (with the front of the bowl 24 at an angle to the ground surface and closer thereto), the excavated object by the scraper 25 is housed into the bowl 24 from the unillustrated opening.

In response to completion of the excavation by the scraper 25, the unillustrated hydraulic cylinder inclines the bowl 24 upward from the ground (inclines the bowl 24 such that the front of the bowl 24 is spaced apart from the ground surface), so that the scraper 25 is spaced apart from the ground surface. With the scraper 25 spaced apart from the ground surface, the load of the excavated object housed in the bowl 24 acts on the ball joint 22 and a pillow block 35 to be described below that receives the load of the axle 26.

The axle 26 rotates due to the towing force of the towing vehicle 1. One of such wheels 27 as above is connected to one end of the axle 26, and the other is connected to the other end. The wheels 27 serve as a pair of driven wheels that rotates with the rotation of the axle. Note that the wheels 27 may be provided in the front of and at the rear of the scraper vehicle 20 as a front wheel and a rear wheel.

The strain gauge 28 is a resistive element made of metal, and, for example, is bonded, through an electrical insulator, to the lower portion of the hitch 21 as an object to be measured. The strain gauge 28 measures strain in response to a variation in the resistance value of the strain gauge 28 due to extension or contraction of the metal in proportion to the force applied to the hitch 21. The excavated object excavated by the scraper 25 is housed in the bowl 24, so that a load from the excavated object is applied to the bowl 24. The load of the bowl 24 is separately applied to the flexible ball joint 22 and the wheels 27. The flexible ball joint 22 supports part of the load of the bowl 24, and thus a downward tensile stress acts on the hitch 21. The strain gauge 28 can measure a variation in the resistance value of the strain gauge 28 due to the tensile stress on the hitch 21. Then, the control device 33 can measure the weight of the excavated object in the bowl 24 on the basis of the resistance value detected by the strain gauge 28.

In the present embodiment, how the load W applied to the bowl 24 is separated into the ball joint 22 and the pillow block 35 is detected in advance. As an example, it is assumed that 40% of the load W acts on the ball joint 22 and 60% of the load W acts on the pillow block 35. In this case, the resistance value measured by the strain gauge 28 is 40% of the load W, and the control device 33 can calculate the load W applied to the bowl 24 by converting the load W to be 100%.

In addition, in the present embodiment, the resistance value of the strain gauge 28 with the bowl 24 empty or with a load of 100 Kg applied to the bowl 24 may be measured and stored in advance in the memory 31 as a table. With the bowl 24 empty, only the load of the scraper vehicle 20 acts, and thus the amount of variation from this state is the weight of the excavated object housed in the bowl 24.

In addition, the table stored in the memory 31 may store the resistance value of the strain gauge 28 when a plurality of loads (for example, 200 Kg and 300 Kg) is applied to the bowl 24. Note that FIG. 1 illustrates three strain gauges 28; however, a single strain gauge 28 may be provided and thus the number of strain gauges is not limited. Note that the amount of strain at the center in the X direction that is the left-and-right direction of the hitch 21 is the largest and thus it is preferable to provide a strain gauge 28 at the center of the left- and right direction of the hitch 21 and the lower portion in the Z direction that is the up-and-down direction of the hitch 21.

In the present embodiment, the accelerometer 29 detects acceleration acting on the scraper vehicle 20, and any type such as a mechanical type, an optical type, or a semiconductor type of accelerometer can be provided as the accelerometer 29. In the present embodiment, the accelerometer 29 detects acceleration in the Z-axis direction in the vicinity of a strain gauge 28, but is not limited thereto, and may detect acceleration in the X-axis direction and the Y-axis direction. The number of accelerometers 29 may be one, or at least one accelerometer may be provided at each of a plurality of places of the scraper vehicle 20. In this case, the accelerometer 29 may be provided in the vicinity where the load cell 30 is provided, or may be provided at the towing vehicle 1. When the accelerometer 29 is provided at the towing vehicle 1, it is preferable to provide the accelerometer 29 in the vicinity of the ball joint 22.

In the present embodiment, the control device 33 calculates the amount of the excavated object such as earth and sand housed in the bowl 24, on the basis of the amount of strain detected by each strain gauge 28 when output of the accelerometer 29 is smaller than a threshold. Alternatively, the control device 33 may calculate the amount of the excavated object such as earth and sand housed in the bowl 24 from outputs of the strain gauge 28 corresponding to N number (N is a natural number) of outputs of the accelerometer 29 smaller than the threshold, or may calculate the amount of the excavated object by weighting output of the strain gauge 28 when output of the accelerometer 29 is smaller than the threshold. Note that in the first embodiment, if the correction value of output of the strain gauge 28 corresponding to output of the accelerometer 29 is stored in advance in the memory 31, the control device 33 can correct output of the strain gauge 28 on the basis of the correction value stored in the memory 31. As described above, the control device 33 processes or selects the result of the detection by the strain gauge 28, with output of the accelerometer 29.

Figure 3:
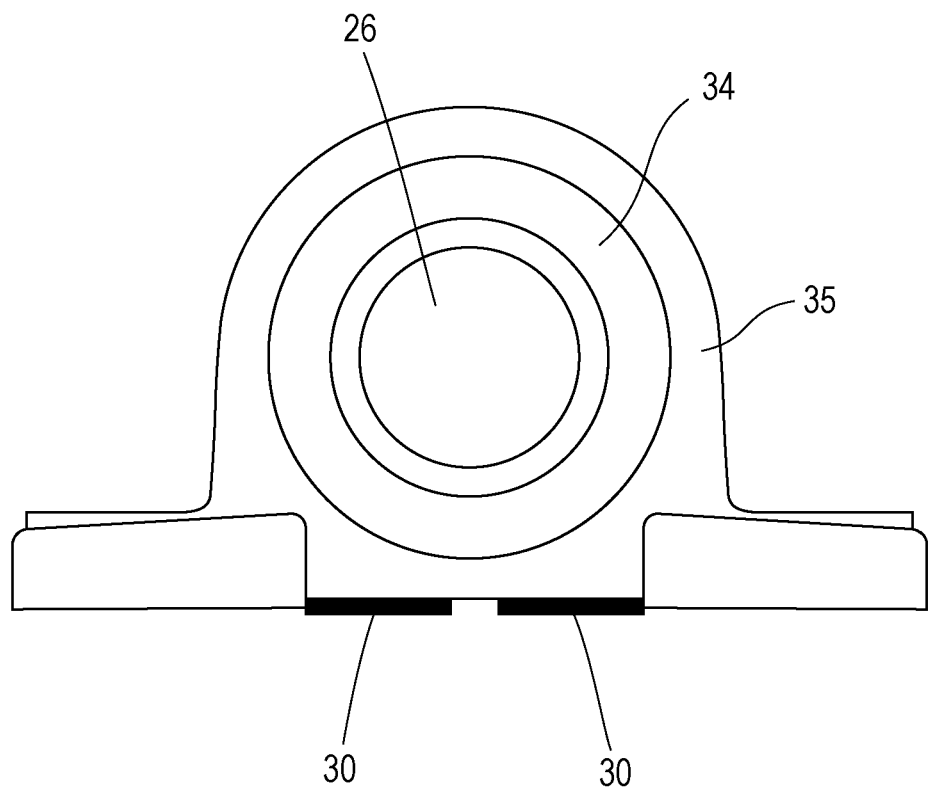
FIG. 3 illustrates load cells provided below an axle of the first embodiment.

FIG. 3 illustrates such load cells 30 as described above provided below the axle 26 of the present embodiment. As illustrated in FIG. 3, the axle 26 is rotatably supported by a bearing 34, and the bearing 34 is held by the pillow block 35 as a bearing base.

Each load cell 30 is provided below the pillow block 35, so that the load cell 30 can detect the load of the excavated object in the bowl 24 acting on the wheel 27.

As the load cell 30, any type of load cell 30 such as a piezoelectric load cell and a strain load cell can be provided. FIG. 3 illustrates two load cells 30; however, the number of load cells 30 may be one or at least three.

In the present embodiment, as described above, the measurement value (resistance value) of each load cell 30 with the bowl 24 empty or with a load of 100 Kg applied to the bowl 24 may be stored in the memory 31 as a table. In this case, it is desirable to store the measurement value (resistance values) of the load cell 30 under a plurality of loads (for example, 200 Kg, 300 kg). The ratio between the load applied to the ball joint 22 and the load applied to the pillow block 35 can be calculated by calibration in which the strain gauge 28 and the load cell 30 perform measurement while changing the loaded state of the bowl 24, and this ratio is stored in the memory 31. Note that such calibration is preferably performed with the towing vehicle 1 and the scraper vehicle 20 stationary, but may be performed with the scraper vehicle 20 towed by the towing vehicle 1, or may be performed with the towing vehicle 1 and the scraper vehicle 20 stationary and with the scraper vehicle 20 towed by the towing vehicle 1.

Note that the calibration may be performed only once, may be performed periodically, or may be performed when the wheels 27 are replaced or after the air pressure of the wheels 27 is adjusted. In addition, the calibration may be performed when the wheels of the towing vehicle 1 are replaced or after the air pressure of the wheels is adjusted. The second and subsequent calibrations may be performed with reduction of the measurement items or the number of measurements from the first measurement, for example, with the bowl 24 empty or with a load of 100 Kg.

The load measurement by the load cell 30 may be performed when an excavated object excavated by the scraper 25 is housed in the bowl 24, in addition to being used in the calibration described above. Also in this case, the amount of the excavated object such as earth and sand housed in the bowl 24 is calculated on the basis of the load detected by the load cell 30 when output of the accelerometer 29 is smaller than the threshold. Alternatively, the control device 33 may calculate the amount of the excavated object such as earth and sand housed in the bowl 24 from outputs of the load cell 30 corresponding to N number (N is a natural number) of outputs of the accelerometer 29 smaller than the threshold, or may calculate the amount of the excavated object by weighting output of the load cell 30 when output of the accelerometer 29 is smaller than the threshold.

As described above, the control device 33 processes or selects the result of the detection by the load cell 30, with output of the accelerometer 29.

Any type of memory may be used as the memory 31, and a nonvolatile semiconductor memory (for example, flash memory) is used in the present embodiment. The memory 31 stores, for example, various programs for driving the scraper vehicle 20; results of measurements by such a strain gauge 28, such an accelerometer 29, and such a load cell 30; and results of calculation by the control device 33.

The communication device 32 communicates with a communication device of a base station, a communication device provided at an unloading place (earth-and-sand accumulation place), or a communication device on the towing vehicle 1 side. As a communication scheme for the communication device 32, any communication scheme may be adopted. In the present embodiment, data communication regarding the weight of the bowl 24 is wirelessly performed with a wireless local area network (LAN) such as Wi-Fi (registered trademark).

Note that in a case where the towing vehicle 1 is provided with an accelerometer 29, the communication device (unillustrated) on the towing vehicle 1 side communicates acceleration detected by the accelerometer 29 to the communication device 32.

The control device 33 includes a central processing unit (CPU) and controls the entirety of the scraper vehicle 20. In the present embodiment, the control device 33 performs control regarding weight measurement of an excavated object housed in the bowl 24. FIG. 4 is a flowchart executed by the control device 33 of the first embodiment, and the description will be continued according to FIG. 4. Note that the flowchart of FIG. 4 illustrates that the scraper 25 is excavating earth and sand with the bowl 24 at an angle to the ground surface (with the front of the bowl 24 at an angle to the ground surface and closer thereto).

Description of Flowchart

The control device 33 detects whether or not the scraper 25 is spaced apart from the ground surface due to the inclination of the bowl 24 upward from the ground by the operator of the scraper vehicle 20 (the inclination of the front of the bowl 24 spaced apart from the ground surface) with a predetermined amount of the excavated object is housed in the bowl 24 (Step S1).

The control device 33 repeats Step S1 until the scraper 25 is spaced apart from the ground surface, and goes to Step S2 after determining that the scraper 25 is spaced apart from the ground surface. Note that the state in which scraper 25 is spaced apart from the ground surface means that the scraper vehicle 20 is moving toward an unloading place (earth-and-sand accumulation place).

The control device 33 causes a strain gauge 28 and an accelerometer 29 that is provided at the ball joint 22 to perform measurement (Step S2). Together with acceleration acting in the Z direction of the ball joint 22, the control device 33 causes the strain gauge 28 to measure a load applied to the ball joint 22 during the movement of the scraper vehicle 20.

The control device 33 may cause a load cell 30 and an accelerometer 29 provided at the pillow block 35 to perform measurement a plurality of times.

Note that the scraper 25 may be provided with a contact sensor. In this case, the control device 33 may determine whether or not the scraper 25 is in contact with the ground surface, and may cause the strain gauge 28 and the accelerometer 29 to perform measurement in Step S2 when the scraper 25 is not in contact with the ground surface.

Following the measurement in Step S2, the control device 33 calculates the weight of the excavated object housed in the bowl 24 (Step S3). In the present embodiment, the control device 33 calculates the amount of the excavated object such as earth and sand housed in the bowl 24, on the basis of the amount of strain detected by the strain gauge 28 when the output of the accelerometer 29 provided at the ball joint 22 is smaller than the threshold. At this time, the control device 33 may use the weight detected by the load cell 30 when the output of the accelerometer 29 provided at the pillow block 35 is smaller than the threshold.

Note that the control device 33 may calculate the weight of the excavated object such as earth and sand housed in the bowl 24 from outputs of the strain gauge 28 and the load cell 30 corresponding to N number (N is a natural number) of outputs of the accelerometer 29 smaller than the threshold, or may calculate the weight of the excavated object by weighting outputs of the strain gauge 28 and the load cell 30 when output of the accelerometer 29 is smaller than the threshold.

Strain may occur in the hitch 21 due to the temperature. Thus, a correction coefficient corresponding to the temperature at the time of performing excavation may be stored in the memory 31 in advance. In this case, such a correction coefficient may be obtained by actual measurement at the time of the calibration described above or at the time of the measurement in Step S2 of FIG. 4, or may be obtained from the linear expansion coefficient (the coefficient of thermal expansion) of the material of the hitch 21. Further, in order to reduce thermal strain of the hitch 21, the strain gauge 28 may be covered with a thermal insulating material.

Note that a correction coefficient of thermal strain may also be obtained for the pillow block 35 at which the load cell 30 is provided, and the correction coefficient may be stored in the memory 31.

When the calculation of the weight of the excavated object housed in the bowl 24 in Step S3 is completed, the control device 33 causes the communication device 32 to transmit the result of the calculation to the communication device of the base station (Step S4). Note that the control device 33 may transmit the result of the calculation to the communication device provided at the unloading place (earth-and-sand accumulation place).

In a case where a plurality of scraper vehicles 20 performs excavation, from the weight of an excavated object received from the communication device 32 of each scraper vehicle 20, the control device of the base station can calculate the overall weight of the excavated objects.

According to the present embodiment, the weight of the excavated object housed in the bowl 24 is detected from the strain of the hitch 21. Thus, the weight of the excavated object can be detected with a simple configuration at low cost. In addition, the weight of the excavated object housed in the bowl 24 is detected during the movement of the scraper vehicle 20. Thus, the weight of the excavated object housed in the bowl 24 can be detected efficiently.

Second Embodiment

Hereinafter, a second embodiment will be described. The same elements as those of the first embodiment are denoted with the same reference signs, and description thereof will not be given.

Figure 5A:
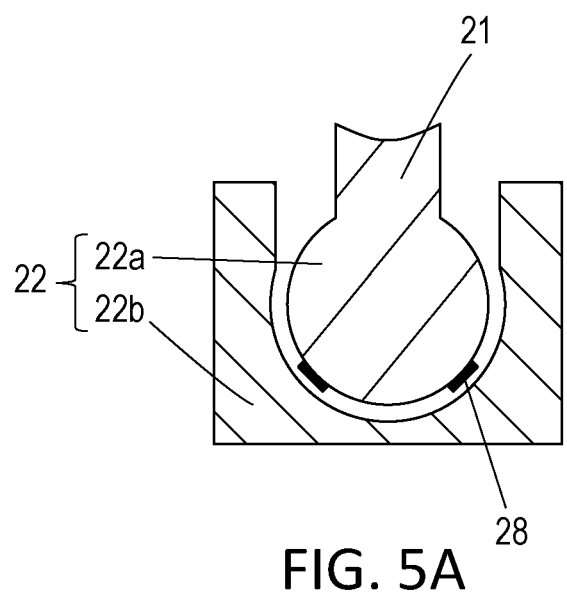
FIG. 5A illustrates a metal ball provided with strain gauges in the configuration of a ball joint of a second embodiment.
Figure 5B:
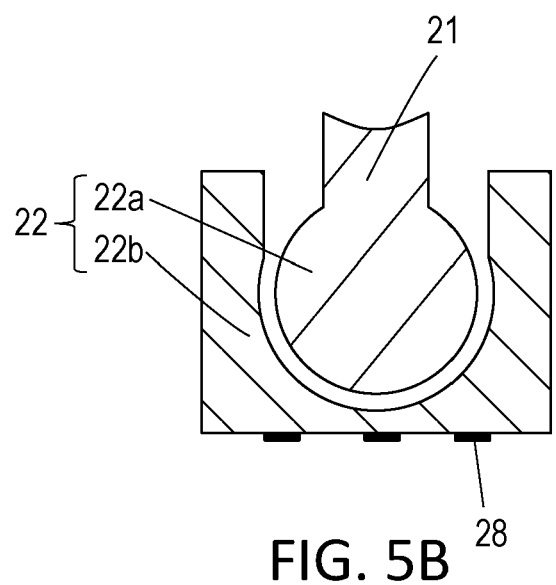
FIG. 5B illustrates a receiving portion provided with strain gauges in the configuration of the ball joint of the second embodiment.

FIGS. 5A and 5B illustrate the configuration of a ball joint 22 of the second embodiment. FIG. 5A illustrates a metal ball provided with strain gauges, and FIG. 5B illustrates a receiving portion provided with strain gauges.

The ball joint 22 includes a rollable metal ball 22a and a receiving portion 22b that supports part of the weight of a hitch 21.

In the present embodiment, a strain gauge 28 is required to be provided at a place where the weight of one end of the hitch 21 is received, may be provided on the lower portion of the metal ball 22a as illustrated in FIG. 5A, or may be provided on the lower portion of the receiving portion 22b as illustrated in FIG. 5B. Two strain gauges 28 are provided in FIG. 5A and three strain gauges 28 are provided in FIG. 5B; however, a single strain gauge 28 may be provided, or at least four strain gauges 28 may be provided.

The first embodiment and the second embodiment can be combined appropriately and modified appropriately.

As an example, the mass of an excavated object housed in a bowl 24 may be obtained from respective measurement values of a strain gauge 28 and an accelerometer 29. When the weight measurement value of the strain gauge 28 is defined as W, W is obtained from the following expression:

$$W = Fm + Fs + (m+s) \cdot a \qquad \text{Expression (1)}$$

Here, Fm is the weight of a scraper vehicle 20, m is the mass of the scraper vehicle 20, Fs is the weight of the excavated object, s is the mass of the excavated object, a is the vertical acceleration due to traveling of the scraper vehicle 20, and g is the gravitational acceleration.

Expression (1) can be replaced as below:

$$W = m \cdot g + s \cdot g + (m+s) \cdot a \qquad \text{Expression (2)}$$

When Expression (2) is rearranged, the mass s of the excavated object is obtained as below:

$$s = W/(g+a) - m \qquad \text{Expression (3)}$$

The mass m of the scraper vehicle 20 is known, and thus the mass s of the excavated object housed in the bowl 24 can be obtained from the measurement values of the strain gauge 28 and the accelerometer 29.

In addition, a non-contact rangefinder such as an ultrasonic rangefinder or a laser rangefinder may be provided above the bowl 24 to detect whether or not the bowl 24 is full. Alternatively, whether or not the bowl 24 is full may be detected from an image captured by a camera provided above the bowl 24. A control device 33 may cause, for example, the strain gauge 28 and the accelerometer 29 to start measurement in response to the bowl 24 being full.

In addition, the scraper vehicle 20 may be provided with a global positioning system (GPS), and for example, the strain gauge 28 and the accelerometer 29 may start measurement with the scraper vehicle 20 on the way to an unloading place (earth-and-sand accumulation place). In this case, it is preferable that a flat place is selected from, for example, terrain data, and for example, the strain gauge 28 and the accelerometer 29 start measurement using detection, by the GPS, of arrival at the flat place as a trigger.

Note that in a case where the time of excavation operation by the scraper vehicle 20 is determined, the scraper vehicle 20 may be provided with a timer. In this case, for example, the strain gauge 28 and the accelerometer 29 may start measurement after the elapse of predetermined duration.

The embodiments described above are merely examples for describing the present invention, and thus various changes may be made without departing from the gist of the present invention. For example, in the above embodiments, the towing vehicle 1 is provided as the driving vehicle. However, a push-type driving vehicle that pushes the scraper vehicle 20 from the rear of the scraper vehicle 20 may be provided.

In addition, the scraper vehicle 20 may be provided with a gyro sensor that detects an angular velocity from the Coriolis force, and a strain gauge 28, an accelerometer 29, or a load cell 30 may perform measurement when the angular velocity acting on the scraper vehicle 20 is small.

Note that the strain gauge 28, the accelerometer 29, or the load cell 30 may perform measurement with the scraper vehicle 20 stationary. In addition, the weight of an excavated object housed in the bowl 24 may be detected with the scraper vehicle 20 stationary and with the scraper vehicle 20 moving, the weight in the moving state may be corrected with the weight in the stationary state as a reference and the correction value may be stored in the memory 31. Then, in calculation of the weight in the next and subsequent moving states, the calculated weight may be corrected on the basis of the correction value stored in the memory 31.

In addition, a gyro sensor may be used instead of the accelerometer or in combination with the accelerometer.

Positioning is not limited to the GPS, and any positioning system may be used if it serves as a satellite positioning system.

The auxiliary drive system described in WO 2020/261788 A1 filed by the applicant of the present application may be equipped with the scraper vehicle 20. As the auxiliary drive system, a system including a hydraulic pump, an accumulator (accumulation device), and a hydraulic motor can be applied.

The following is a list of reference numbers used in the specification and drawings.
1 towing vehicle
20 scraper vehicle
21 hitch
22 ball joint
24 bowl
25 scraper
28 strain gauge
29 accelerometer
30 load cell
31 memory
32 communication device
33 control device

The invention claimed is:

1. A scraper vehicle configured to move with a driving vehicle, the scraper vehicle comprising:
a coupler having a first portion to be coupled to the driving vehicle;
a first detection device provided on at least one of the first portion of the coupler or a first supporting member that supports the first portion, wherein the first detection device is configured to detect a variation in strain of the first portion and the first portion and the first supporting member support a part of a weight of an excavated object loaded on the scraper vehicle; and a calculation device configured to calculate the weight of the excavated object loaded on the scraper vehicle, based on the variation in strain detected by the first detection device and a load acting on the first portion.

2. The scraper vehicle according to claim 1, wherein the first detection device detects the variation in strain of the first portion during movement of the scraper vehicle.

3. The scraper vehicle according to claim 1, further comprising:
a scraper capable of excavating a ground surface,
wherein the first detection device detects the variation in strain of the first portion when the scraper is not in contact with the ground surface.

4. The scraper vehicle according to claim 1, further comprising:
a correction unit configured to correct a result of the detection by the first detection device in accordance with a temperature.

5. The scraper vehicle according to claim 1, further comprising:
a first accelerometer provided in a vicinity of the first detection device; and
a first processing device configured to process a result of the detection by the first detection device, based on a result of detection by the first accelerometer.

6. The scraper vehicle according to claim 5, wherein the first processing device selects the result of the detection by the first detection device, based on the result of detection by the first accelerometer.

7. The scraper vehicle according to claim 5, further comprising:
a second detection device provided at a second supporting member that supports an axle of the scraper vehicle, the second detection device being configured to detect a variation in a load acting on the second supporting member,
wherein the calculation device is configured to calculate a ratio between a load acting on the first supporting member and the load acting on the second supporting member, based on a result of the detection by the first detection device and a result of the detection by the second detection device.

8. The scraper vehicle according to claim 7, wherein the second detection device includes a load cell.

9. The scraper vehicle according to claim 1, wherein the first detection device includes a strain gauge provided at the first portion.

10. The scraper vehicle according to claim 9, further comprising:
a first accelerometer provided in a vicinity of the first detection device; and
a first processing device configured to process a result of the detection by the first detection device, based on a result of detection by the first accelerometer.

11. The scraper vehicle according to claim 10, wherein the first processing device selects the result of the detection by the first detection device, based on the result of detection by the first accelerometer.

12. The scraper vehicle according to claim 9, further comprising:
a second detection device provided at a second supporting member that supports an axle of the scraper vehicle, the second detection device being configured to detect a variation in a load acting on the second supporting member,
wherein the calculation device is configured to calculate a ratio between a load acting on the first supporting member and the load acting on the second supporting member, based on a result of the detection by the first detection device and a result of the detection by the second detection device.

13. The scraper vehicle according to claim 12, further comprising:
a second accelerometer provided in a vicinity of the second detection device; and
a second processing device configured to process the result of the detection by the second detection device, based on a result of detection by the second accelerometer.

14. The scraper vehicle according to claim 12, wherein the second detection device includes a load cell.

15. The scraper vehicle according to claim 14, further comprising:
a second accelerometer provided in a vicinity of the second detection device; and
a second processing device configured to process the result of the detection by the second detection device, based on a result of detection by the second accelerometer.

16. A scraper vehicle configured to move with a driving vehicle, the scraper vehicle comprising:
a coupler having a first portion to be coupled to the driving vehicle;
a first detection device provided on at least one of the first portion of the coupler or a first supporting member that supports the first portion, the first detection device being configured to detect a variation in strain of the first portion;
a second detection device provided at a second supporting member that supports an axle of the scraper vehicle, the second detection device being configured to detect a variation in a load acting on the second supporting member; and
a calculation device configured to calculate a weight of an excavated object loaded on the scraper vehicle, based on the variation in strain detected by the first detection device, and wherein the calculation device is configured to calculate a ratio between a load acting on the first supporting member and the load acting on the second supporting member, based on a result of the detection by the first detection device and a result of the detection by the second detection device.

17. The scraper vehicle according to claim 16, further comprising:
a second accelerometer provided in a vicinity of the second detection device; and
a second processing device configured to process the result of the detection by the second detection device, based on a result of detection by the second accelerometer.

18. The scraper vehicle according to claim 16, wherein the second detection device includes a load cell.

19. The scraper vehicle according to claim 18, further comprising:
a second accelerometer provided in a vicinity of the second detection device; and
a second processing device configured to process the result of the detection by the second detection device, based on a result of detection by the second accelerometer.

20. A scraper vehicle configured to move with a driving vehicle, the scraper vehicle comprising:

a coupler having a first portion to be coupled to the driving vehicle; and
a first detection device provided on at least one of the first portion of the coupler or a first supporting member that supports the first portion, wherein the first detection device is configured to detect a variation in strain of the first portion,
wherein the first detection device performs the detection with a known weight loaded on the scraper vehicle while the scraper vehicle is moving; and
a calculation device configured to calculate the weight of the known weight loaded on the scraper vehicle, based on the variation in strain detected by the first detection device and a load acting on the first portion.

\* \* \* \* \*